US011614786B2

(12) United States Patent
Woodbury et al.

(10) Patent No.: US 11,614,786 B2
(45) Date of Patent: *Mar. 28, 2023

(54) POWER LIMIT ALTERATIONS OF COMPONENT TYPES

(71) Applicant: Hewlett-Packard Development Company, L.P., Spring, TX (US)

(72) Inventors: Christopher Woodbury, Spring, TX (US); Angus Liu, Taipei (TW); Shaheen Saroor, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/706,970

(22) Filed: Mar. 29, 2022

(65) Prior Publication Data

US 2022/0221923 A1 Jul. 14, 2022

Related U.S. Application Data

(63) Continuation of application No. 17/048,392, filed as application No. PCT/US2018/044602 on Jul. 31, 2018, now Pat. No. 11,307,629.

(51) Int. Cl.
*G06F 1/32* (2019.01)
*G06F 1/3206* (2019.01)
*G06F 1/3287* (2019.01)

(52) U.S. Cl.
CPC .......... *G06F 1/3206* (2013.01); *G06F 1/3287* (2013.01)

(58) Field of Classification Search
CPC ............................ G06F 1/3206; G06F 1/3287
See application file for complete search history.

(56) References Cited

U.S. PATENT DOCUMENTS

| 6,938,176 | B1 | 8/2005 | Alben et al. |
| 8,510,582 | B2 | 8/2013 | Naffziger et al. |
| 9,250,665 | B2 | 2/2016 | Avkarogullari et al. |
| 9,261,935 | B2 | 2/2016 | Branover et al. |
| 9,274,574 | B2 | 3/2016 | Conroy et al. |
| 9,494,994 | B1 | 11/2016 | Law et al. |
| 2007/0050650 | A1 | 3/2007 | Conroy et al. |

(Continued)

FOREIGN PATENT DOCUMENTS

| CN | 105739668 A | 7/2016 |
| EP | 2051156 A2 | 4/2009 |

OTHER PUBLICATIONS

Price, D., et al., "Optimizing performance per watt on GPUs in high performance computing; Temperature, frequency and voltage effects", Computer Science—Research and Development, Jul. 2014, pp. 1-21.

*Primary Examiner* — Stefan Stoynov
(74) *Attorney, Agent, or Firm* — Quarles & Brady LLP

(57) ABSTRACT

In some examples, a non-transitory machine-readable medium can include instructions executable by a processing resource to: monitor system power for a computing system that includes a first computing component type and a second computing component type, determine a power event type for the computing system based on the monitored system power, and alter a power limit of the second computing component type by a predetermined increment based on the power event type while maintaining a power limit of the first computing component type when the second computing component type is a sub-system of the computing system.

15 Claims, 4 Drawing Sheets

(56) References Cited

U.S. PATENT DOCUMENTS

| | | |
|---|---|---|
| 2011/0022833 A1 | 1/2011 | Nussbaum et al. |
| 2011/0055597 A1 | 3/2011 | Wyatt |
| 2012/0030625 A1 | 2/2012 | Miyazaki |
| 2012/0249559 A1 | 10/2012 | Khodorkovsky et al. |
| 2012/0324248 A1 | 12/2012 | Schluessler et al. |
| 2016/0054776 A1 | 2/2016 | Lu et al. |
| 2017/0031431 A1 | 2/2017 | Khatri et al. |
| 2019/0113956 A1 | 4/2019 | Hung |
| 2019/0265776 A1 | 8/2019 | Montero et al. |

POWER LIMIT ALTERATIONS OF COMPONENT TYPES

PRIORITY INFORMATION

This application is a continuation of U.S. National Stage application Ser. No. 17/048,392 filed on Oct. 16, 2020, which claims priority to International Application No. PCT/US2018/044602 filed on Jul. 31, 2018. The contents of which are incorporated herein by reference in its entirety.

BACKGROUND

A computing system can include a plurality of different systems. For example, the computing system can include a main circuit assembly and a processing resource such as a central processing unit (CPU). In some examples, the computing system can include a plurality of sub-systems that can be communicatively coupled to the main circuit assembly to perform a number of functions for the computing system. In some examples, the sub-systems can utilize processing resources that are separate from the CPU.

DETAILED DESCRIPTION

Figure 1:
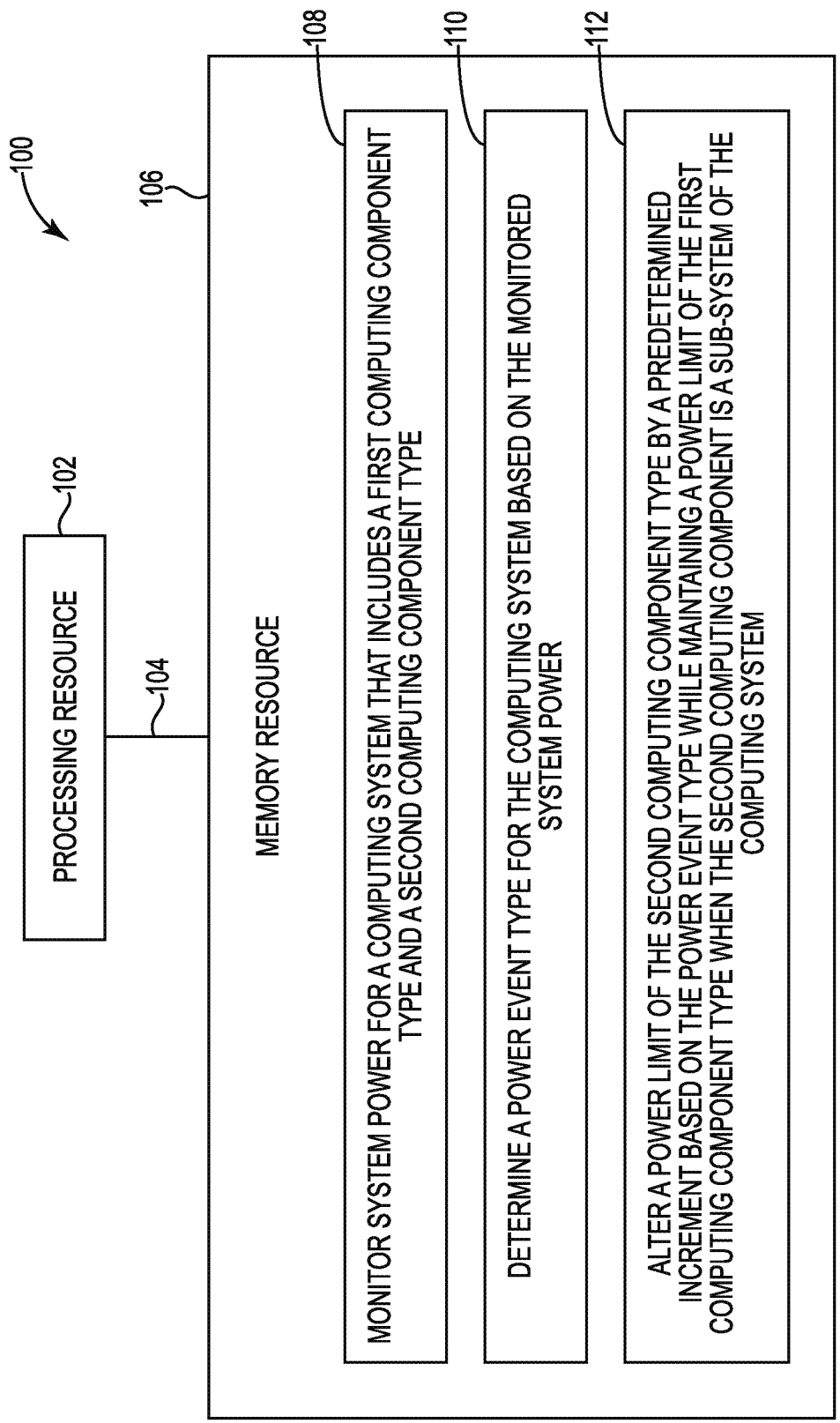
FIG. 1 is a block diagram of an example of a system for altering power limits consistent with the disclosure.

A computing system can be a system that utilizes a plurality of computing components and/or a plurality of computing systems. For example, a computing system can be a computing device that can include processing resources, memory resources, circuit assemblies, network resources, among other types of computing components. In some examples, the computing system can include computing thresholds that when exceeded can trigger an event. As used herein, a computing threshold can be an upper or lower limit of a computing metric. For example, a computing threshold can include power thresholds for a power computing metric, temperature thresholds for a temperature computing metric, and/or other types of thresholds that correspond to other types of computing metrics.

In some examples, the computing thresholds can be applied to the computing system and/or applied to individual computing components. For example, a system power threshold can be applied to the overall computing system and a central processing unit (CPU) power threshold can be applied to the CPU. The present disclosure relates to utilizing a computing threshold of the overall computing system to alter a power limit or operating power limit of a sub-system of the computing system. As used herein, a sub-system of the computing system can include a system or device of the computing system that does not include the CPU. For example, a sub-system of the computing system can include a graphical processing unit (GPU) of a graphics card or graphics circuit assembly. In this example, the graphics circuit assembly can include the GPU, but may be separate from the CPU.

In some examples, a monitor can be utilized to monitor computing metrics of the computing system. As used herein, a monitor can be a hardware device or instructions stored on a memory resource that when executed by a processing resource can monitor the computing metrics of the computing system. For example, a monitor can be utilized to monitor power usage for the overall computing system. In this example, the power usage for the overall computing system can include power utilized by a main system that includes the CPU, sub-systems that include a GPU, and/or other systems of the computing system.

In some examples, the monitor can trigger an event when a threshold is exceeded by the computing system. As used herein, an event can be a notification or signal that can indicate that a computing metric of the computing system has exceeded a corresponding threshold. For example, a power event can be a notification that the computing system has utilize a quantity of power that has exceeded a power threshold. In some examples, a voltage power manager (VPM) can be utilized to alter a power limit of a sub-system when an event of the overall computing system has occurred. In this way, the computing metrics of the overall system can be controlled by altering the performance (e.g., power limits, etc.) of the sub-systems, which can provide less impact on the main system of the computing system.

FIG. 1 is a block diagram of an example of a system 100 for altering power limits consistent with the disclosure. In some examples, the system 100 can include a memory resource 106 that can be utilized to store instructions 108, 110, 112 that can be executed by a processing resource 102 to perform functions described herein. In some examples, the processing resource 102 can be coupled to the memory resource 106 via a connection 104. Connection 104 can be a physical or wireless communication connection that can be utilized to transfer data signals between the processing resource 102 and the memory resource 106.

A processing resource 106 may be a central processing unit (CPU), microprocessor, and/or other hardware device suitable for retrieval and execution of instructions stored in memory resource 106. In the particular example shown in FIG. 1, processing resource 102 may receive, determine, and send instructions 108, 110, 112. As an alternative or in addition to retrieving and executing instructions 108, 110, 112, processing resource 102 may include an electronic circuit comprising a number of electronic components for performing the operations of the instructions 108, 110, 112 in the memory resource 106. With respect to the executable instruction representations or boxes described and shown herein, it should be understood that part or all of the executable instructions 108, 110, 112 and/or electronic circuits included within one box may be included in a different box shown in the figures or in a different box not shown.

Memory resource 106 may be any electronic, magnetic, optical, or other physical storage device that stores executable instructions 108, 110, 112. Thus, memory resource 106 may be, for example, Random Access Memory (RAM), an Electrically-Erasable Programmable Read-Only Memory (EEPROM), a storage drive, an optical disc, and the like. The executable instructions 108, 110, 112 may be stored on the memory resource 106. Memory resource 106 may be a portable, external or remote storage medium, for example, that allows the system 100 to download the instructions 108, 110, 112 from the portable/external/remote storage medium. In this situation, the executable instructions 108, 110, 112 may be part of an "installation package". As described herein, memory resource 106 may be encoded with executable instructions 108, 110, 112 for remote device configurations as described herein.

In some examples, the memory resource 106 can include instructions 108 that are executable by the processing resource 102 to monitor system power for a computing system that includes a first computing component type and a second computing component type. As described herein, monitoring system power for the computing system can include utilizing a monitor to determine a quantity of electrical power being utilized by the computing system. For example, the monitor can determine a quantity of power that is being utilized by the first computing component and the second computing component. In this example, the monitor can compare the quantity of power being utilized by the computing system to a power threshold to determine when a power event occurs. In this example, a power event can occur when the quantity of power being utilized by the computing system meets or exceeds the power threshold.

In some examples, the computing system can include a first computing component type and a second computing component type. As used herein, a first computing component type can be a main circuit assembly and a second computing component type can be a sub-circuit assembly. As described herein, the main circuit assembly can be a circuit assembly that includes a CPU for the computing system. In addition, the sub-circuit assembly can be a circuit assembly that does not include the CPU for the computing system. In some examples, the sub-circuit assembly can include other types of processing resources such as a GPU. As used herein, a circuit assembly can be a mechanical support that can electrically connect electrical components utilizing conductive tracks or other features separated by a non-conductive substrate. For example, a circuit assembly can include a printed circuit board (PCB) or printed circuit assembly (PCA) and structural features to protect the circuit assembly.

In some examples, the memory resource 106 can include instructions 108 that are executable by the processing resource 102 to determine a power event type for the computing system based on the monitored system power. In some examples, determining the power event can include receiving a signal from a monitor that detects a computing metric, such as electrical power, has exceeded a corresponding threshold. For example, determining the power event can include a monitor has provided a signal that electrical power utilized by the computing system has exceeded a power threshold for the computing system.

In some examples, the power event type can be an event for the overall computing system. In some examples, the power event type can be a particular type of event based on monitored computing metrics for the overall system and not specific to a particular system or sub-system of the computing system. For example, the power event type can be a power event that utilizes the power computing metrics for the overall system and not a specific system or sub-system of the computing system.

In some examples, the power event type can be a particular type of power event from a plurality of power event types. For example, the power event type can be an initial event type, a subsequent event type, and/or other type event that can occur on the computing system. As used herein, an initial event type can include a relatively short duration of a computing metric exceeding a threshold. For example, an initial event type can be an event that is a relatively short duration of electrical power exceeding a power threshold for the computing system. As used herein, a subsequent type can include a relatively long duration of a computing metric exceeding a threshold that may demand a relatively larger alteration of a computing system compared to the initial event type. In some examples, the subsequent event type can be an event that exists after actions have been taken to cure to the initial event type. For example, the subsequent event type can occur when a power level of a component is reduced in response to an initial event type and the event continues.

In some examples, the event type of the computing system can be utilized to determine an alteration of a power limit of a sub-system for the computing system. For example, a level of the alteration of the power limit for the sub-system can be based on the event type. For example, when the event type is an initial event type, the sub-system can be altered to a first power limit and when the event type is a subsequent event, the sub-system can be altered to a second power limit when the event type is a subsequent event. As described herein, the event can be based on computing metrics of the overall system and the sub-system can be altered without altering a main system.

In some examples, the memory resource 106 can include instructions 108 that are executable by the processing resource 102 to alter a power limit of the second computing component type by a predetermined increment based on the power event type while maintaining a power limit of the first computing component type when the second computing component type is a sub-system of the computing system. As used herein, a power limit includes a maximum quantity of electrical power to be utilized by a particular device or system. For example, a sub-system of the computing system can include a power limit of 35 Watts (W). In this example, the sub-system can be limited to utilizing 35 W of electrical power during operation.

In some examples, the power limit of the sub-system can be altered in response to the event that is based on the overall system. For example, the overall system can exceed a power threshold and a power event can occur. In this example, a power limit of the second computing component type or sub-system of the overall system can be altered to a lower power limit. In some examples, the power limit of the second computing component type can be altered despite a power usage of the second computing component type. Thus, in some examples, the power utilized by the second computing component type may not be monitored individually from the overall computing or utilized to determine power alterations for the overall computing system.

In some examples, the second computing component type can be altered by a predetermined increment based on the power event type. As used herein, the predetermined increment can include a predetermined level or percentage. For example, the predetermined increment can be a quantity of power or percentage of power. In one example, the predetermined increment can be a percentage of 80% of a present power limit of a particular sub-system. That is, the power limit of the sub-system can be altered from 100% to 80% when a particular event type has occurred for the computing system. In some examples, the predetermined increment can be a particular value of power. For example, the predetermined increment can be a value of 5 W. In this example, the power limit of a sub-system can be 35 W and the power limit of the sub-system can be altered to 30 W during an event.

In some examples, the predetermined increment can be based on the power event type. In some examples, a first event type can result in altering a power limit a predetermined increment of a first value and a second event type can result in altering the power limit a predetermined increment of a second value. For example, an initial event can result in altering the power limit of a sub-system by 5 W and a subsequent event can result in altering the power limit of the sub-system by 10 W.

In some examples, the predetermined increment can be based on a device type or system type of the second computing component type. For example, the predetermined increment can be based on an initial power limit or manufacturer power limit. As used herein, an initial power limit or manufacturer power limit can be a recommended power limit for normal operation of the device or system. For example, the initial power limit can be a preset power limit for the device or system. In some examples, a first sub-system with a first initial power limit can have a first predetermined increment for a particular event type and a second sub-system with a second initial power limit can have a second predetermined increment for the particular event type. In some examples, the second initial power limit can be greater than the first initial power limit. In these examples, the second predetermined increment can be greater than the first predetermined increment. That is, a greater initial power limit can correspond to a greater predetermined increment.

In some examples, the memory resource 106 can include instructions that are executable by the processing resource 102 to monitor system power for the computing system with the altered power limit of the second computing component type. For example, the monitor that determined or provided the signal that the event occurred can be utilized to continue to monitor the overall system.

In addition, the memory resource 106 can include instructions that are executable by the processing resource 102 to alter the power limit of the second computing component type by an additional predetermined increment when the power event type is monitored with the altered power limit of the second computing component type. In some examples, the event that prompted altering the power limit of the second computing component type can continue even after the power limit of the second computing component type is altered to a lower power limit. In these examples, the power limit of the second computing component type can be altered by an additional predetermined increment. In some examples, the additional predetermined increment can be the same as the initial predetermined increment. For example, the second computing component can be altered by 5 W in the initial predetermined increment and the second computing component can be altered by 5 W in the additional predetermined increment. In this example, the second computing component can have an initial power limit of 35 W and after the initial predetermined increment have a power limit of 30 W, and after the additional predetermined increment have a power limit of 25 W.

In some examples, the memory resource 106 can include instructions that are executable by the processing resource 102 to determine when the power event for the computing system has ended based on monitored power for the computing system and alter the power limit of the second computing component type to an original power level or initial power limit. For example, when it is determined that the power level of the overall system has fallen below an event threshold, the power limit of the second computing component type can be altered back to the initial power limit. In some examples, the power limit of the second computing component type can be altered to an intermediary power limit before altering the power limit back to the initial power limit. For example, the initial power limit for the second computing component type can be 35 W. In this example, the power limit can be altered from 25 W to 30 W when it is determined that the event has ended. In this example, if the event has ended while the power limit of the second computing component is operating at 30 W, the power limit can be altered back to the initial power limit of 35 W.

In some examples, the memory resource 106 can include instructions that are executable by the processing resource 102 to assert a processor hot (PROCHOT) function of the second computing component type to alter the power limit of the second computing component type. As used herein a PROCHOT function can include a function of a processing resource that can be utilized to alter a power limit of the processing resource. For example, the PROCHOT function can be a function that forcibly reduces power consumption to a minimum operating power. As used herein, the minimum operating power for a device is a power level that can provide a start-up function. For example, a power level below the minimum operating power may not start up or function. In some examples, the PROCHOT function can be utilized to alter the power limit of the second computing component type when the second computing component type is a GPU that includes PROCHOT function capabilities.

Figure 2:
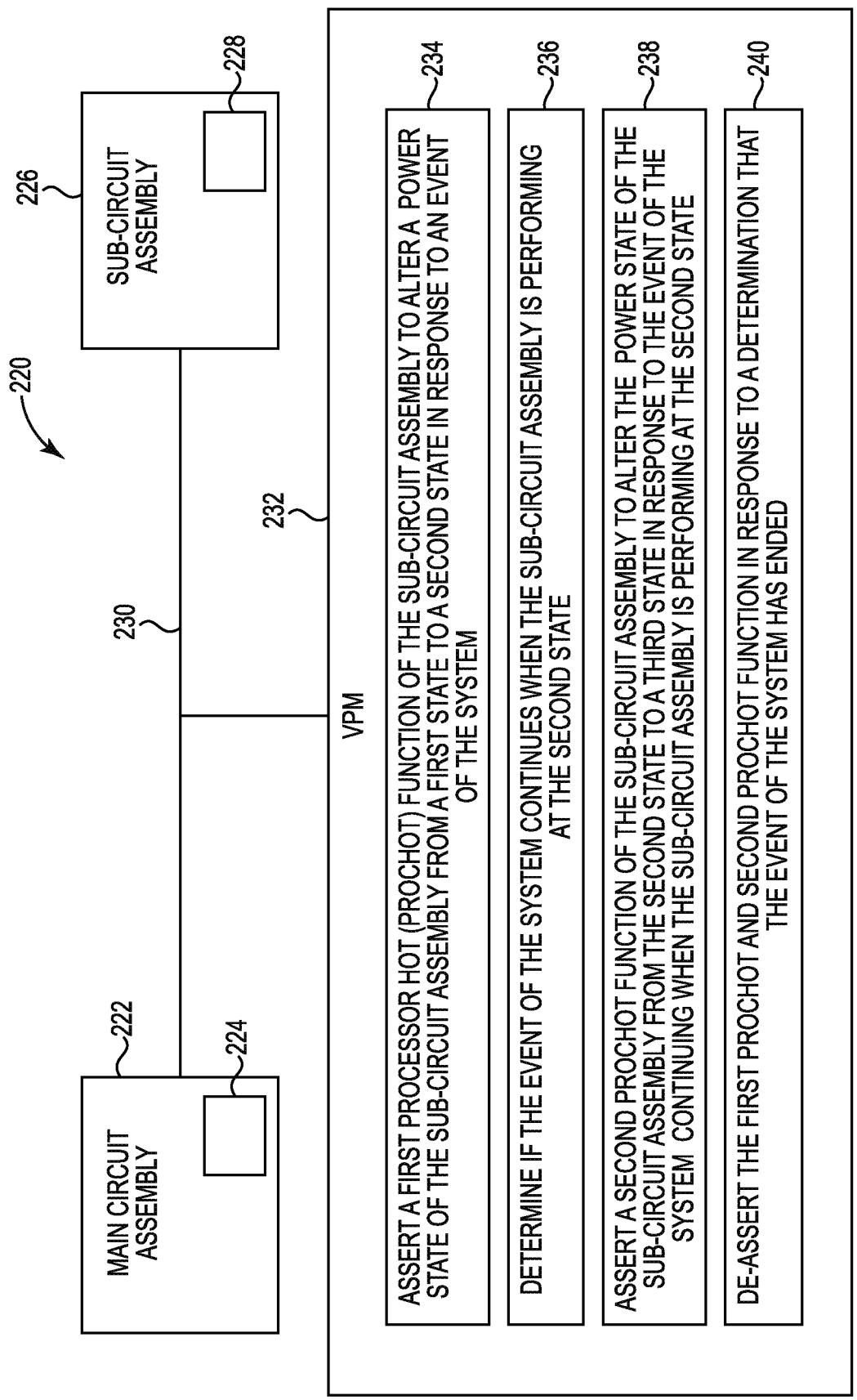
FIG. 2 is a block diagram of an example of a system for altering power limits consistent with the disclosure.

FIG. 2 is a block diagram of an example of a system 220 for altering power limits consistent with the disclosure. In some examples, the system 220 can include a main circuit assembly 222 and a sub-circuit assembly 226. As described herein, the main circuit assembly 222 can include a CPU 224 and the sub-circuit assembly 226 can include a non-CPU processing resource 228. For example, the non-CPU processing resource can be a GPU. In some examples, the main circuit assembly 222 can be separate from the sub-circuit assembly. However, the main circuit assembly 222 can be communicatively coupled to the sub-circuit assembly via a connection 230. In this way, the main circuit assembly 222 can communicate or transfer communication packets with the sub-circuit assembly 226 via the connection 230.

In some example, the system 220 can include a voltage power manager (VPM) 232 that can be communicatively coupled to the main circuit assembly 222 and/or the sub-circuit assembly 226. In some examples, the VPM 232 can be utilized to monitor and control particular functions of the system 220 including the main circuit assembly 222 and the sub-circuit assembly 226. For example, the VPM 232 can monitor power usage of the system 220. In some examples, the VPM 232 can be coupled to other monitoring circuitry to monitor temperature of the system 220.

In some examples, the VPM can include instructions 234, 236, 238, 240. In some examples, the VPM can utilize a memory resource (e.g., memory resource 106 as referenced in FIG. 1, etc.) to store the instructions 234, 236, 238, 240. As described herein, the instructions 234, 236, 238, 240 can be executed by a processing resource (e.g., processing resource 102, etc.) to perform particular functions.

In some examples, the VPM can include instructions 234 that are executable by a processing resource to assert a first processor hot (PROCHOT) function of the sub-circuit assembly 226 to alter a power state of the sub-circuit assembly 226 from a first state to a second state in response to an event of the system 220. As described herein, a PROCHOT function can be a function of a processing resource 228 of the sub-circuit assembly 226 that can be utilized to alter a power limit of the processing resource 228 and/or the sub-circuit assembly.

In some examples, a duty cycle of the PROCHOT function can be utilized to alter the power state of the sub-circuit assembly 226 by a predetermined increment as described herein. For example, a duty cycle of the PROCHOT function can be utilized to alter a power limit of the sub-circuit assembly 226 from 35 W to 30 W in response to a particular type of event occurring on the system 220. As used herein, the duty cycle of the PROCHOT function includes a percent of time the PROCHOT is asserted on a processing resource such as processing resource 228.

In some examples, the first state of the sub-circuit assembly 226 can be an initial power state for the sub-circuit assembly 226. For example, the first state of the sub-circuit assembly 226 can be a manufacturer set power state for the sub-circuit assembly 226. In some examples, the second state of the sub-circuit assembly 226 can be an altered power state of the second sub-circuit assembly 226. For example, the second state of the sub-circuit assembly can be a state when the sub-circuit assembly 226 includes a power limit that is lower than the first state by a predetermined increment. In some examples, the predetermined increment can be based on the first state of the sub-circuit assembly 226. For example, the predetermined increment can be based on the initial power limit of the sub-circuit assembly 226. In some examples, the predetermined increment can be proportional to the initial power limit. That is, a relatively larger initial power limit can correspond to a relatively larger predetermined increment.

In some examples, the VPM 232 can include instructions 236 that are executable by a processing resource to determine if the event of the system 220 continues when the sub-circuit assembly 226 is performing at the second state. In some examples, a monitor can be utilized to compare computing metrics of the system 220 to corresponding threshold values. In some examples, the event that initiated altering the sub-circuit assembly 226 from the first state to the second state can be the same event that is monitored to determine it the event is continuing when the sub-circuit assembly 226 is performing at the second state. As described herein, the monitor can utilize computing metrics for the overall system 220 to determine when the event is occurring or when the event has ended.

In some examples, the VPM 232 can include instructions 238 that are executable by a processing resource to assert a second PROCHOT function of the sub-circuit assembly 226 to alter the power state of the sub-circuit assembly 226 from the second state to a third state in response to the event of the system 220 continuing when the sub-circuit assembly 226 is performing at the second state. In some examples, the event may still exist or continue to exist for the system 220 even when the sub-circuit assembly 226 is operating at the second state. In these examples, the second PROCHOT function can be utilized to alter the sub-circuit assembly 226 from the second state to the third state.

In some examples, the third state of the sub-circuit assembly 226 can include a power limit for the sub-circuit assembly 226 that is lower than the second state of the sub-circuit assembly 226. For example, the power limit of the sub-circuit assembly 226 can be lowered by a predetermined increment to alter the sub-circuit assembly 226 from the second state to the third state. As described herein, the predetermined increment can be based on the event type and/or based on device type. For example, the predetermined increment can be based on the initial power limit of the sub-circuit assembly 226 and/or based on whether the type of event.

In some examples, the VPM 232 can include instructions 240 that are executable by a processing resource to de-assert the first PROCHOT and second PROCHOT function in response to a determination that the event of the system has ended. In some examples, the altered state of the sub-circuit assembly 226 can be returned to the first state or initial state of the sub-circuit assembly 226. For example, the predetermined increment alterations of the power limit of the sub-circuit assembly 226 can be restored to a previous state or increased by the same predetermined increment. In this way, the sub-circuit assembly 226 can be dynamically altered during events and restored to a relatively higher power limit when the event has ended. In addition, the power limit or state of the main circuit assembly 222 and/or CPU 224 can remain constant during the event.

Figure 3:
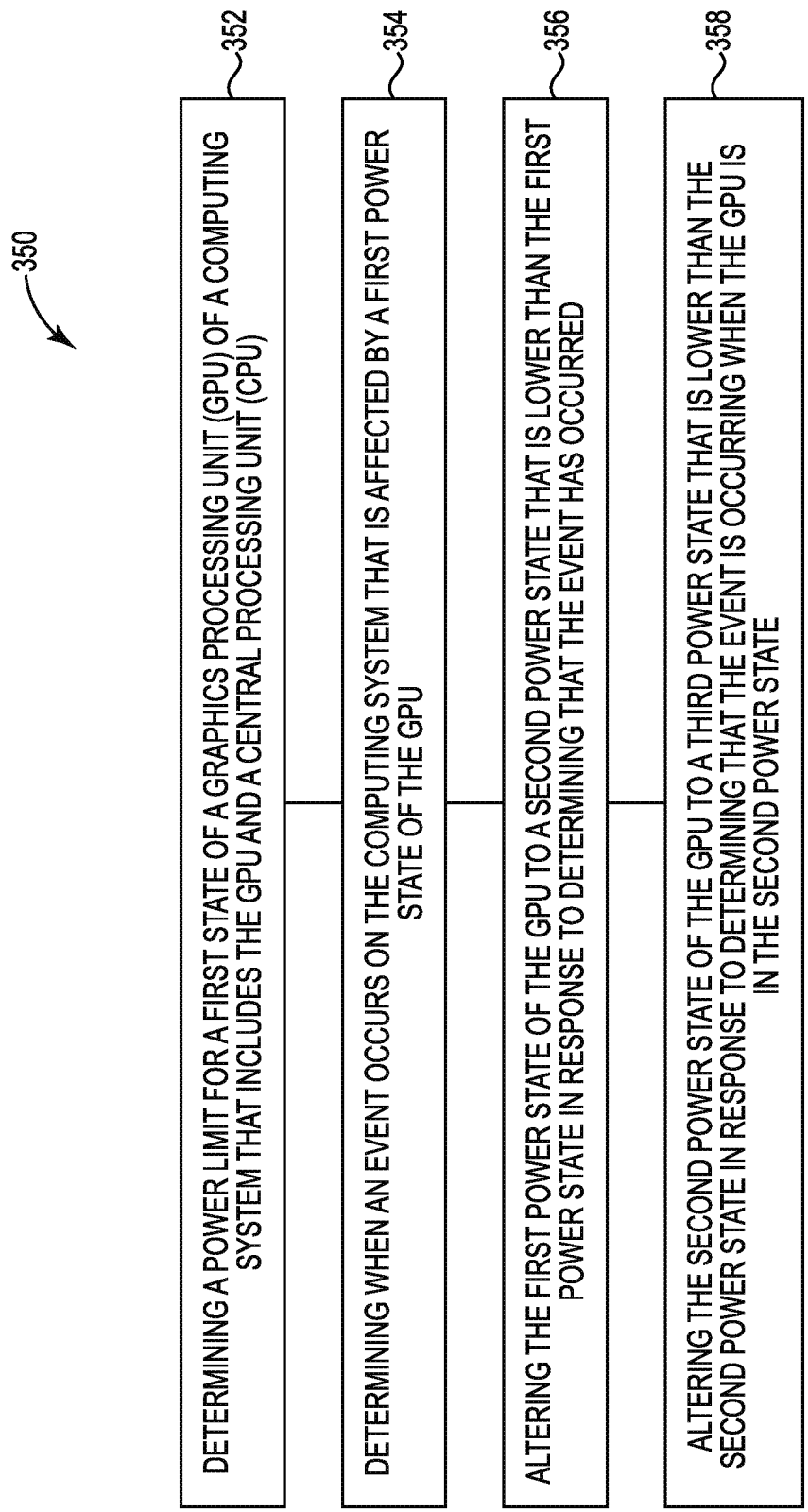
FIG. 3 is a block diagram of an example of a method for altering power limits consistent with the disclosure.

FIG. 3 is a block diagram of an example of a method 350 for altering power limits consistent with the disclosure. In some examples, the method 350 can be executed by a computing device or system. For example, the method 350 can include instructions stored on a memory resource (e.g., memory resource 106 as referenced in FIG. 1) that are executable by a processing resource (e.g., processing resource 102 as referenced in FIG. 1, etc.).

At 352, the method 350 can include determining a power limit for a first state of a graphics processing unit (GPU) of a computing system that includes the GPU and a central processing unit (CPU). As described herein, the power limit for the first state of the GPU can be an initial state of the GPU. For example, the first state of the GPU can be a manufacturer setting that can be established by the manufacturer of the GPU. In some examples, the GPU can be designed by the manufacturer to operate safely at the first state of the GPU.

At 354, the method 350 can include determining when an event occurs on the computing system that is affected by a first power state of the GPU. In some examples, the event can be based on monitored computing metrics for the computing system. That is, the monitored computing metrics for the overall computing system can be utilized to determine when an event occurs. As described herein, the event can be a determination that a particular computing metric, such as power or temperature, has met or exceeded a corresponding threshold value. In some examples, the event of the computing system can be affected by the first power state of the GPU when the power state of the GPU can alter the computing metrics that were used to determine that the event has occurred. For example, the event can be a power event and altering the state of the GPU can alter the electrical power utilized by the overall computing system.

At 356, the method 350 can include altering the first power state of the GPU to a second power state that is lower than the first power state in response to determining that the event has occurred. In some examples, altering the first power state of the GPU to the second power state can include utilizing a PROCHOT function of the GPU to alter a power limit of the GPU. In some examples, altering the first power state of the GPU to the second power state can include lowering the power limit of the GPU by a predetermined increment or value. For example, the power limit of the GPU can be lowered by a quantity or percentage of Watts when altering the first power state of the GPU to the second power state of the GPU. As described herein, the predetermined increment can be based on the type of event that has occurred and/or based on the first power state of the GPU.

At 358, the method 350 can include altering the second power state of the GPU to a third power state that is lower than the second power state in response to determining that the event is occurring when the GPU is in the second power state. In some examples, altering the GPU from the second power state to the third power state can include lowering the power limit of the GPU an additional predetermined increment or value. In some examples, the additional predetermined increment or value can be the same as the predetermined increment utilized to alter the GPU from the first power state to the second power state.

In some examples, the method 350 can include altering the third power state to the first power state in response to determining that the event has ended. As described herein, the GPU can be returned to an original power limit when the event has ended. In some examples, the GPU can first be altered from the third power state to the second power state to determine if the event continues while the GPU is in the second power state. In these examples, a monitor can determine whether the event has ended while the GPU is in the second power state. In these examples, the GPU can be altered from the second power state to the first power state when the event has ended while the GPU is in the second power state.

In some examples, the method 350 can include maintaining a power state of the CPU when altering the first power state of the GPU to the second power state. As described herein, the power state of the CPU can be maintained when altering the power state of the GPU. In this way, the CPU can continue to provide functions for the computing system during events.

Figure 4:
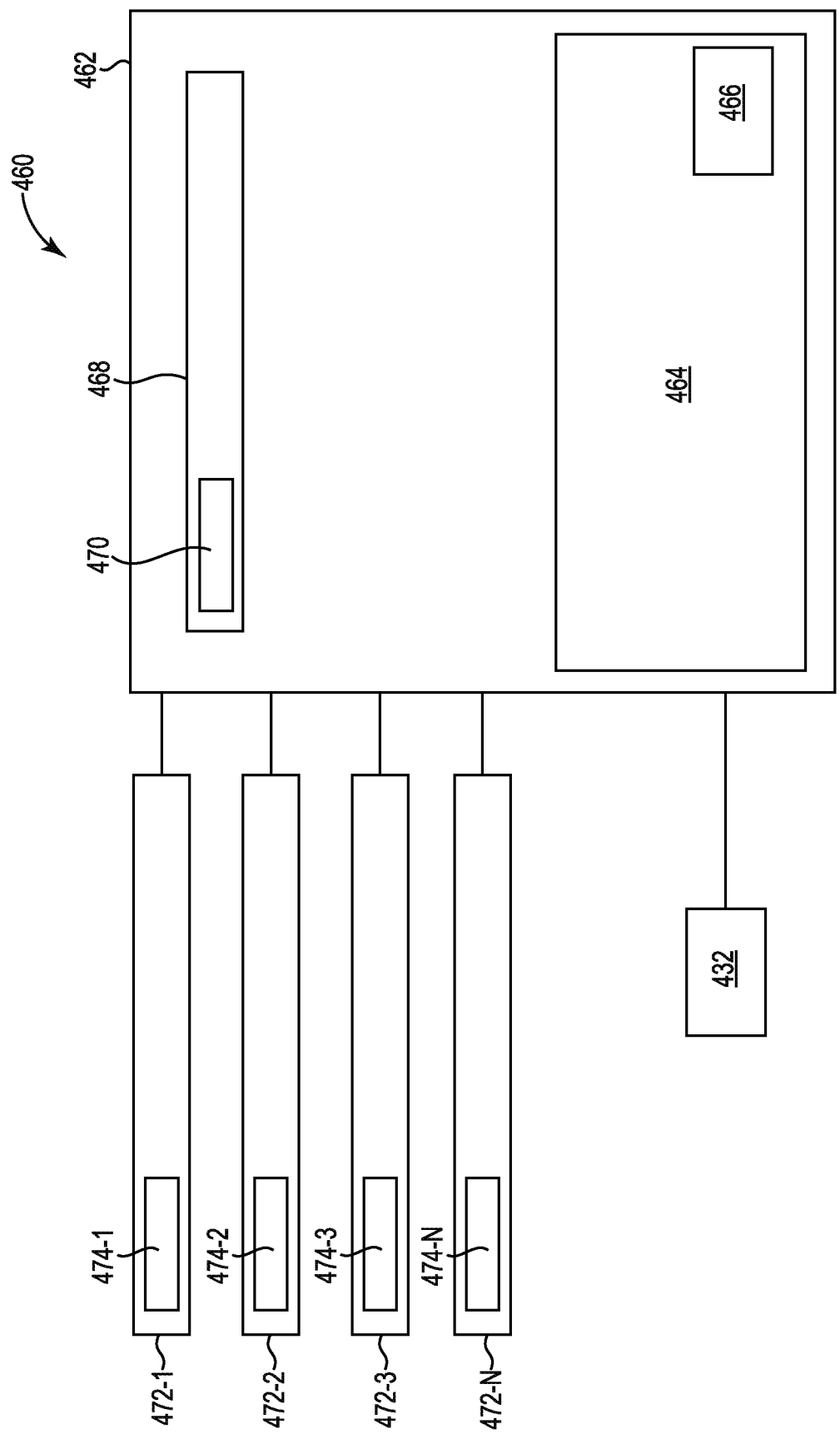
FIG. 4 illustrates an example of a computing system consistent with the disclosure.

FIG. 4 illustrates an example of a computing system 460 consistent with the disclosure. In some examples, the computing system 460 can include a voltage power manager (VPM) 432. In some examples, the VPM 432 can be utilized to monitor computing metrics of the computing system 460 and/or alter states of elements of the computing system 460.

In some examples, the computing system 460 can include an enclosure 462. The enclosure can be utilized to encase or surround computing components. In some examples, the enclosure 462 can be utilized to protect the computing components within the enclosure 462. In some examples, the enclosure 462 can include a main circuit assembly 464 (e.g., motherboard, etc.) that can include a CPU 466. In some examples, the main circuit assembly 464 can be utilized to perform a plurality of functions for the computing system 460.

In some examples, the computing system 460 can include a sub-circuit assembly 468 with a processing resource 470 position within the enclosure 462. As described herein, the sub-circuit assembly 468 can be utilized to perform a particular function. For example, the sub-circuit assembly 468 can be a graphics card that can be utilized to process graphics for a display of the computing system 460. In this example, the processing resource 470 can be a GPU.

In some examples, the computing system 460 can include a plurality of sub-circuit assemblies 472-1, 472-2, 472-3, 472-N that are coupled to the enclosure 462. For example, the plurality of sub-circuit assemblies 472-1, 472-2, 472-3, 472-N can be coupled to a bus of a computing device that utilizes the enclosure 462. In some examples, the plurality of sub-circuit assemblies 472-1, 472-2, 472-3, 472-N can each be graphics cards similar to the sub-circuit assembly 468. In some examples, the plurality of sub-circuit assemblies 472-1, 472-2, 472-3, 472-N can each be a sub-circuit assembly that can perform a specific function. For example, the plurality of sub-circuit assemblies 472-1, 472-2, 472-3, 472-N can each be a graphics card with a corresponding GPU 474-1, 474-2, 474-3, 474-N.

As described herein, the VPM 432 can utilize a monitor to determine computing metrics for the overall computing system 460. For example, the VPM 432 can utilize a monitor to determine a power usage for the main circuit assembly 464, the sub-circuit assembly 468, and the plurality of sub-circuit assemblies 472-1, 472-2, 472-3, 472-N. In addition, the VPM 432 can be utilized to determine when an event occurs for the overall computing system 460. That is, the VPM 432 can determine when a power event occurs based on the monitored computing metrics for the main circuit assembly 464, the sub-circuit assembly 468, and the plurality of sub-circuit assemblies 472-1, 472-2, 472-3, 472-N.

As described herein, the VPM 432 can be utilized to alter a state or power limit of the sub-circuit assembly 468 and/or the plurality of sub-circuit assemblies 472-1, 472-2, 472-3, 472-N in response to determining that an event has occurred or is occurring for the overall computing system 460. In some examples, the VPM 432 can be utilized to determine a particular sub-circuit assembly from the sub-circuit assembly 468 and the plurality of sub-circuit assemblies 472-1, 472-2, 472-3, 472-N to alter a state. For example, the VPM can select the sub-circuit assembly 472-1 from the sub-circuit assembly 468 and the plurality of sub-circuit assemblies 472-1, 472-2, 472-3, 472-N. In this example, the VPM can alter a state of the sub-circuit assembly 472-1 when an event for the overall computing system 460 has occurred. In addition, the VPM 432 can maintain a state or power limit of the main circuit assembly 464 when the event has occurred for the overall computing system 460.

The figures herein follow a numbering convention in which the first digit corresponds to the drawing figure number and the remaining digits identify an element or component in the drawing. Similar elements or components between different figures can be identified by the use of similar digits. For example, 102 can reference element "02" in FIG. 1, and a similar element can be referenced as 202 in FIG. 2. Elements shown in the various figures herein can be added, exchanged, and/or eliminated so as to provide a plurality of additional examples of the disclosure.

In addition, the proportion and the relative scale of the elements provided in the figures are intended to illustrate the examples of the disclosure, and should not be taken in a limiting sense. As used herein, the designator "N", particularly with respect to reference numerals in the drawings, indicates that a plurality of the particular feature so designated can be included with examples of the disclosure. The designators can represent the same or different numbers of the particular features. Further, as used herein, "a plurality of" an element and/or feature can refer to more than one of such elements and/or features.

What is claimed:

1. A non-transitory machine-readable medium including instructions executable by a processing resource to:
   determine a power event type for a computing system based on a monitored system power that includes a first computing component type and a second computing component type; and
   alter a power limit of the second computing component type by an increment based on the power event type while maintaining a power limit of the first computing component type.

2. The medium of claim 1, wherein the second computing component type is a sub-system of the computing system that is separate from a central processing unit (CPU) of the computing system.

3. The medium of claim 1, comprising instructions executable by the processing resource to:

monitor system power for the computing system with the altered power limit of the second computing component type; and alter the power limit of the second computing component type by an additional increment when the power event type is monitored with the altered power limit of the second computing component type.

4. The medium of claim 1, wherein the increment is based on a power delivery limit of the second computing component type.

5. The medium of claim 1, comprising instructions executable by the processing resource to:

determine when the power event for the computing system has ended based on monitored power for the computing system; and alter the power limit of the second computing component type to an original power level.

6. The medium of claim 1, wherein the first computing component type is a main system of the computing system that includes a CPU.

7. The medium of claim 1, comprising instructions executable by the processing resource to assert a processor hot (PROCHOT) function of the second computing component type to alter the power limit of the second computing component type.

8. A system comprising:

a main circuit assembly that includes a central processing unit (CPU) of a computing system;

a sub-circuit assembly that includes a sub processing unit of the computing system;

a voltage power manager (VPM) device to:

assert a processor hot (PROCHOT) function of the sub-circuit assembly to alter a power state of the sub-circuit assembly from a first state to a second state in response to an event of the system and an initial state of the sub-circuit assembly; and de-assert the PROCHOT function in response to a determination that the event of the system has ended.

9. The system of claim 8, wherein the VPM is to:

determine if the event of the system continues when the sub-circuit assembly is performing at the second state;

assert an additional PROCHOT function of the sub-circuit assembly to alter the power state of the sub-circuit assembly from the second state to a third state in response to the event of the system continuing when the sub-circuit assembly is performing at the second state.

10. The system of claim 8, wherein the event is a temperature event of the system, wherein the temperature event includes a monitored temperature of the system exceeding a threshold temperature.

11. The system of claim 8, wherein the second state is based on an initial power limit of the sub-circuit assembly.

12. A method comprising:

determining when an event occurs on a computing system that includes a graphics processing unit (GPU) and a central processing unit (CPU), wherein the GPU is operating at a first power state when the event occurs;

altering the first power state of the GPU to a second power state by a first increment in response to determining that the event has occurred; and altering the second power state of the GPU to a third power state by a second increment in response to determining that the event is occurring when the GPU is in the second power state.

13. The method of claim 12, further comprising altering the third power state to the first power state in response to determining that the event has ended.

14. The method of claim 12, wherein the first power state is a first power delivery limit of the GPU represented by a first max voltage, the second power state is a second power delivery limit of the GPU represented by a second max voltage that is less than the first max voltage.

15. The method of claim 12, further comprising maintaining a power state of the CPU when altering the first power state of the GPU to the second power state.

* * * * *